United States Patent Office 3,175,926
Patented Mar. 30, 1965

3,175,926
VINYLIDENE CHLORIDE TERPOLYMER AS A COATING FOR REGENERATED CELLULOSE FILM
Harold G. Hahn, Midland, Eugene E. Kochaney, Bay City, and James H. Modeen, Midland, Mich., assignors to The Dow Chemical Company, Midland, Mich., a corporation of Delaware
No Drawing. Filed May 2, 1962, Ser. No. 191,757
6 Claims. (Cl. 117—122)

This invention relates to moisture-proof, heat-sealable, flexible transparent film, and more particularly to the production of a film comprising regenerated cellulose coated with a moistureproof, heat-sealable, flexible, transparent coating of organic polymeric material, which coating tightly adheres to the base film even under high moisture conditions.

The coating of flexible, transparent, regenerated cellulose film and the like with vinyl polymers and copolymers for the purpose of rendering the film moisture-resistant, heat-sealable and otherwise improving the properties thereof is well known. Because they are tough, flexible, strong, odorless, transparent, heat-sealable and inherently moisture-resistant, thin coatings of vinylidene chloride/acrylonitrile copolymers particularly recommend themselves for this purpose. Coatings of vinylidene chloride/acrylonitrile copolymers comprising at least about 80 percent of vinylidene chloride have excellent moistureproofness but their adhesion to the base film under high moisture conditions such as are encountered when the coated film is wrapped around products containing considerable water (cheese, fish, fresh vegetables, etc.), is very poor. In order to improve the adhesion, it is currently necessary to first apply an anchoring subcoating and then the vinylidene chloride/acrylonitrile coating, which represents a costly and time-consuming extra processing step, and hence a commercial disadvantage.

An object of this invention therefore is to improve the adherence or anchorage to the base film of transparent, moistureproof, heat-sealable coatings of vinylidene chloride interpolymers.

Another object is to provide a regenerated cellulose film having in direct contact therewith a well adhered moistureproof, heat-sealable, transparent coating of vinylidene chloride terpolymer.

Still another object is to provide moistureproof, heat-sealable, transparent coatings of vinylidene chloride terpolymers which terpolymer strongly adheres directly to base materials, such as regenerated cellulose film, even when the coated base materials is maintained in an atmosphere of high moisture content or in direct contact with water for a considerable period of time.

Other and related objects will become evident from the following specification and claims.

These objects are realized, according to the invention, by coating a base film or sheet of regenerated cellulose, by any convenient coating technique, with a coating composition comprising as the film forming component essentially a terpolymer obtained by polymerizing a mixture of (1) between about 80 and 93 weight percent of vinylidene chloride, (2) between about 4.5 and 19.5 weight percent of a copolymerizable monoethylenically unsaturated monomer as defined herein, and (3) between about 0.5 and 2.5 weight percent of a copolymerizable unsaturated glycidyl ester containing an unsaturated aliphatic group, the proportions being selected to total 100 weight percent.

The copolymerizable monoethylenically unsaturated monomers useful for the purposes of the present invention are selected from the group consisting of acrylonitrile, alkyl esters of acrylic and methacrylic acids having from 1 to 18 carbon atoms in the alkyl group, and vinyl chloride.

Specific examples of such monomers include but are not restricted to, methyl methacrylate, ethyl methacrylate, butyl methacrylate, octyl methacrylate, n-dodecyl methacrylate, n-octadecyl methacrylate, methyl acrylate, ethyl acrylate, propyl acrylate, butyl acrylate, phenyl methacrylate, cyclohexyl methacrylate, p-cyclohexylphenyl methacrylate, methacrylonitrile, methyl vinyl ketone, vinyl chloride, and mixtures thereof.

The copolymerizable monoethylenically unsaturated monomers defined herein should constitute from between about 4.5 and 19.5 weight percent of the monomer charge. Less than 4.5 weight percent of such compound(s) results in insolubility, and more than about 19.5 weight percent imparts inferior moistureproofness.

The copolymerizable glycidyl esters useful for the purposes of the present invention contain both the glycidyl radical and an aliphatic unsaturated group within the molecule.

Typical glycidyl esters include those obtained from glycidol and acrylic acid, methacrylic acid, and alpha-chloro acrylic acid. Esters such as the maleic, crotonic, and cinnamic esters of glycidol may also be employed.

The preparation of these materials is well known to those skilled in the art, and is described among many other reference sources in U.S. 2,470,324, issued May 17, 1949.

The unsaturated glycidyl esters as defined herein should constitute from between 0.5 and 2.5 weight percent of the weight of the coating composition of the present invention; below 0.5 weight percent the anchorage of the resulting terpolymer under high moisture conditions is unsatisfactory and terpolymers resulting from a reaction mixture containing in excess of 2.5 weight percent of the unsaturated glycidyl ester are not sufficiently soluble.

The monomers may be copolymerized by any known method to form the copolymers useful for the present invention. For example, the copolymerization may be conducted in aqueous emulsions containing a catalyst, e.g. potassium persulfate and any of the well known emulsifying and/or dispersing agents. Alternatively, the copolymers may be prepared by polymerization of the monomeric components in bulk without added diluent, or the monomers may be reacted in appropriate organic solvent reaction media.

There is no critical order of addition of the various components of the monomeric mixture to be polymerized. A convenient manner of carrying out the process is to mix the unsaturated glycidyl ester with the remaining monomers in an aqueous medium containing the catalyst. The various components of the monomeric mixture to be polymerized can also conveniently be premixed and added to the aqueous medium containing the catalyst and acid.

The terpolymers useful for the present invention are coated on the regenerated cellulose base film by any suitable technique, and may be applied as an organic solvent solution or from aqueous emulsion.

The following examples, wherein all parts and percentages are to be taken by weight, illustrate the present invention but are not to be construed as limiting its scope.

EXAMPLE 1

The following charge was placed in a glass reaction bottle.

| | Grams |
|---|---|
| Water | 200 |
| Potassium persulfate | 0.24 |
| Diisopropyldixanthogen | 0.38 |
| Dioctyl ester of sodium sulfosuccinic acid | 0.16 |
| Acrylonitrile | 8 |
| Vinylidene chloride | 72 |
| Glycidyl acrylate | 2 |

The charge was polymerized by heating the same to a reaction temperature of 60° C. and maintaining such reaction temperature for a time period of 16 hours, after which the polymeric emulsion was freeze-coagulated over night, and subsequently thawed, filtered, and dried.

The terpolymer thus formed was dissolved in tetrahydrofuran in amounts sufficient to form a lacquer comprising about 20 parts by weight of terpolymer in about 80 parts by weight of tetrahydrofuran, and subsequently coated on a sheet of regenerated cellulose film about 0.0012 of an inch thick using a number 28 stainless steel wire-wound film casting rod.

The sheet of coated regenerated cellulose film was then placed in a circulating air oven operating at a temperature of 121° C. for a time period of 3 minutes, and subsequently the coated film was conditioned at 50 percent relative humidity at a temperature of 25° C. for a time period of 16 hours.

Test samples were prepared by applying a fibrous tape about 0.75 of an inch wide and 6 inches long to both the coating and the regenerated cellulose film, after which the sheet was cut into strips corresponding to the dimensions of the taped area. The tape covered strip of coated regenerated cellulose film was then placed in the jaws of an Instron Tensile Tester and peeled at a cross-head speed of 10 inches per minute, under constant conditions of 65 percent relative humidity at a temperature of 22° C. The adhesion was measured as grams of force required to peel the coating from the regenerated cellulose.

An additional charge similar to that described herein but not containing the glycidyl acrylate was, polymerized, formed into a lacquer coating, applied as a coating to regenerated cellulose film, and the film subsequently tested for adherence, as herein described, for comparative purposes.

Table I illustrates the force in grams required to peel the polymeric vinylidene chloride coatings from the regenerated cellulose film, for each of the test samples described herein.

Table I

| Run No. | Glycidyl Ester | Grams of Force Required to Separate Polymeric Vinylidene Chloride Coatings from Regenerated Cellulose Films |
|---|---|---|
| 1 | None | 13 |
| 2 | Glycidyl acrylate | 56 |

EXAMPLE 2

In each of a series of experiments the following charge was placed in a glass reaction bottle:

| | Grams |
|---|---|
| Water | 200 |
| Potassium persulfate | 0.24 |
| Diisopropyldixanthogen | 0.38 |
| Dioctyl ester of sodium sulfosuccinic acid | 0.16 |
| Vinyl chloride | 16 |
| Vinylidene chloride | 64 |

To each of the charges, 2 grams of one of a series of glycidyl esters, as shown in the following Table II, were added with stirring.

Procedures used for preparation of the corresponding polymeric emulsions, lacquer coating systems, and individual coated regenerated cellulose test samples, as well as testing procedures to determine the force in grams required to peel the polymeric vinylidene chloride coating from the regenerated cellulose film were those as described in Example 1.

Table II illustrates the glycidyl esters used, and the force in grams required to peel the polymeric vinylidene chloride coating from the regenerated cellulose film, for each of the test samples described herein.

Table II

| Run No. | Glycidyl Ester | Grams of Force Required to Separate Polymeric Vinylidene Chloride Coatings from Regenerated Cellulose Films |
|---|---|---|
| 1 | None | 5 |
| 2 | Glycidyl Acrylate | 40 |
| 3 | Glycidyl Methacrylate | 72 |

The results illustrated by Examples 1 and 2 indicate that moistureproof, heat-sealable, transparent coating compositions comprising as the film-forming components essentially a terpolymer obtained by polymerizing the prescribed amounts of (1) vinylidene chloride, (2) acrylonitrile or vinyl chloride, and (3) a copolymerizable unsaturated glycidyl ester containing an unsaturated aliphatic group, as defined herein; have noticeably greater adhesion to the regenerated cellulose film as compared to coating compositions comprising as the film forming component essentially a copolymer obtained by polymerizing the indicated amounts of (1) vinylidene chloride, and (2) acrylonitrile or vinyl chloride.

Similar good results are obtained by coating a base film or sheet of regenerated cellulose, by any convenient coating technique, with a moistureproof, heat-sealable, transparent coating composition comprising as the film-forming components essentially a terpolymer obtained by polymerizing a mixture of (1) between about 80 and 93 weight percent of vinylidene chloride, (2) between about 4.5 and 19.5 weight percent of a copolymerizable monoethylenically unsaturated monomer as defined herein, and (3) between about 0.5 and 2.5 weight percent of a copolymerizable unsaturated glycidyl ester containing an unsaturated aliphatic group, the proportions being selected to total 100 weight percent.

What is claimed is:

1. A moistureproof, heat-sealable wrapping tissue comprising regenerated cellulose film having a self-anchored coating comprising essentially a terpolymer obtained by polymerizing a mixture of (1) between about 80 and 93 weight percent of vinylidene chloride, (2) between about 4.5 and 19.5 weight percent of a copolymerizable monoethylenically unsaturated monomer, and (3) between about 0.5 and 2.5 weight percent of a copolymerizable unsaturated glycidyl ester selected from the group consisting of glycidyl acrylate and glycidyl methacrylate, the proportions being selected to total 100 weight percent.

2. The wrapping tissue of claim 1, wherein said copolymerizable monoethylenically unsaturated monomer is acrylonitrile.

3. The wrapping tissue of claim 1, wherein said copolymerizable monoethylenically unsaturated monomer is vinyl chloride.

4. The process which comprises (I) coating a transparent base film of regenerated cellulose with a self-anchored coating dissolved in an organic solvent therefor, said coating comprising essentially a terpolymer of (1) between about 80 and 93 weight percent of vinylidene chloride, (2) between about 4.5 and 19.5 weight percent of a copolymerizable monoethylenically unsaturated monomer, and (3) between about 0.5 and 2.5 weight percent of a copolymerizable unsaturated glycidyl ester selected from the group consisting of glycidyl acrylate and glycidyl methacrylate, the proportions being selected to total 100 percent, and (II) heating the coated base films to remove the solvent.

5. The process of claim 4, wherein said copolymerizable monoethylenically unsaturated monomer is acrylonitrile.

6. The process of claim 4, wherein said copolymerizable monoethylenically unsaturated monomer is vinyl chloride.

References Cited by the Examiner
UNITED STATES PATENTS

| | | | |
|---|---|---|---|
| 2,470,324 | 5/49 | Staudinger et al. | 260—86.3 |
| 3,018,197 | 1/62 | Covington et al. | 117—145 |

WILLIAM D. MARTIN, *Primary Examiner.*

RICHARD D. NEVIUS, *Examiner.*